United States Patent

Nijhuis et al.

[11] Patent Number: 5,612,430
[45] Date of Patent: Mar. 18, 1997

[54] PROCESS FOR MOLECULAR WEIGHT REGULATION IN (CO)POLYMERS

[75] Inventors: Walter H. N. Nijhuis, Hengelo; Auke G. Talma, Bathmen; Luc L. T. Vertommen, Westervoort, all of Netherlands; Bernard J. Maillard, Pessac, France

[73] Assignee: Akzo Nobel nv, Arnhem, Netherlands

[21] Appl. No.: 446,665

[22] PCT Filed: Nov. 25, 1993

[86] PCT No.: PCT/EP93/03323

§ 371 Date: Jul. 5, 1995

§ 102(e) Date: Jul. 5, 1995

[87] PCT Pub. No.: WO94/13705

PCT Pub. Date: Jun. 23, 1994

[30] Foreign Application Priority Data

Dec. 4, 1992 [EP] European Pat. Off. ............ 92203756

[51] Int. Cl.$^6$ ................................ C08F 4/34; C08F 2/38
[52] U.S. Cl. .............. 526/232.5; 526/242; 526/328; 526/343; 526/344; 526/346; 526/319; 526/348; 526/341; 526/335; 526/82
[58] Field of Search .................... 526/232.5, 82, 526/242, 319, 328, 341, 343, 344, 346, 348

[56] References Cited

U.S. PATENT DOCUMENTS

| | | | |
|---|---|---|---|
| 3,248,374 | 4/1966 | Covington | 260/78.5 |
| 3,560,529 | 2/1971 | Blumbergs et al. | 260/346.8 |
| 3,726,832 | 4/1973 | Komatsu et al. | 260/47 |
| 4,176,219 | 11/1979 | Makino et al. | 526/92 |
| 4,405,742 | 9/1983 | Musch et al. | 524/315 |
| 5,292,839 | 3/1994 | Vertommen et al. | 526/232 |

FOREIGN PATENT DOCUMENTS

| | | | |
|---|---|---|---|
| 1944756 | 5/1970 | Germany. | |
| 9106535 | 5/1991 | WIPO. | |
| WO91/06535 | 5/1991 | WIPO | C07C 409/16 |
| WO91/07387 | 5/1991 | WIPO | C07C 409/18 |
| WO91/07440 | 5/1991 | WIPO | C08F 2/38 |
| WO92/06953 | 4/1992 | WIPO | C07C 409/20 |

OTHER PUBLICATIONS

Fedorova et al., *Ukr. Khim Zh.* (Russ. Ed.), 52 (9), 1986, pp. 966–8.
Fedorova et al., *Izv. Vyssh. Uchebn. Zaved, Khim. Khim Tekhnol.*, 19 (10), 1976, pp. 1504–1506.
Fedorova et al., *Visn. L'viv Politekh. Inst.*, 149, 1981, pp. 43–47.

*Primary Examiner*—Joseph L. Schofer
*Assistant Examiner*—Wu C. Cheng
*Attorney, Agent, or Firm*—Ralph J. Mancini; Louis A. Morris

[57] ABSTRACT

A polymerization method carried out in the presence of unsaturated organic peroxide chain transfer agents is disclosed. Also disclosed are (co)polymers and oligomers made by this process and articles of manufacture comprising one or more (co)polymers or oligomers made by this process. Furthermore, the use of these unsaturated organic peroxides as chain transfer agents is disclosed. The present process reduces the severe retardation of polymerization observed for unsaturated organic peroxide chain transfer agents of the prior art and, in some cases, even improves the monomer conversion in comparison to the control.

8 Claims, No Drawings

PROCESS FOR MOLECULAR WEIGHT REGULATION IN (CO)POLYMERS

The invention relates to a method of radically (co)polymerizing monomers in the presence of unsaturated organic peroxide chain transfer agents to thereby control the molecular weights of the resulting (co)polymers, to (co)polymers and shaped objects containing (co)polymers produced by the instant polymerization methods, and to the use of said unsaturated organic peroxides as chain transfer agents.

The general concept of employing a molecular weight regulating agent, also known as a chain transfer agent, as an additive during polymerization reactions has been known for a long time. A number of different chain transfer agents having an unsaturated group therein have been employed for this purpose.

Perhaps one of the earlier disclosures of such a chain transfer agent is to be found in U.S. Pat. No. 3,248,374, wherein the use of a cyclomonoolefin as a polymerization modifier is disclosed. The presence of these modifiers during the copolymerization of vinylidene chloride with other olefinic materials rendered the resultant polymer more water soluble. Successively, the following compounds have been disclosed as chain transfer agents: cyclic ethers and vinyl ethers (U.S. Pat. No. 3,726,832), allyl halides, benzyl halides or tertiary aliphatic halide compounds (U.S. Pat. No. 4,176,219), and unsaturated ethers, thioethers, amines, and acrylates and thioacrylates of acrylamides (U.S. Pat. No. 4,405,742).

Very recent publications in this area are PCT applications WO 91/06535 and WO 91/07387 disclosing unsaturated organic peroxide compounds substituted with an activating group capable of enhancing the reactivity of the olefinic unsaturation towards free radical addition.

These peroxide compounds may be used as chain transfer agents in the polymerization of monomers. However, they are attended with the disadvantage that severe retardation occurs during the polymerization reaction in their presence thereby resulting in low monomer conversions.

The present invention relates to a method of radically (co)polymerizing monomers with a polymerization initiator in the presence of an effective amount of at least one unsaturated organic peroxide chain transfer agent, characterized in that the unsaturated organic peroxide is selected from the group represented by the following formula:

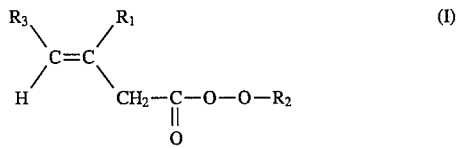
(I)

wherein $R_1$ is an activating group capable of enhancing the reactivity of the olefinic unsaturation towards free radical addition; $R_2$ is selected from the group of hydrogen, $C_1$-$C_{18}$ alkyl, $C_3$-$C_{18}$ alkenyl, $C_3$-$C_{18}$ alkynyl, $C_7$-$C_{22}$ aralkyl, and $C_3$-$C_{18}$ saturated or unsaturated carbocyclic and heterocyclic rings; and $R_3$ is selected from the group of hydrogen, $C_1$-$C_{18}$ alkyl, $C_3$-$C_{18}$ alkenyl, $C_6$-$C_{18}$ aryl, $C_6$-$C_{22}$ alkaryl and $C_7$-$C_{22}$ aralkyl, or $R_1$ and $R_3$ may combine to form a $C_5$-$C_{10}$ ring; all of groups $R_1$, $R_2$, and $R_3$ may be linear or branched and may be optionally substituted with one or more groups selected from hydroxy, alkoxy, aryloxy, epoxy, halogen, acid, ester, nitrile, ketone, and amido.

β-tert-Butyl monoperoxyitaconate, for which in formula I $R_1$ is COOH, $R_2$ is tert-butyl and $R_3$ is hydrogen, is known from Fedorova et al., *Ukr. Khim. Zh.* (Russ. Ed.), 52 (9), 1986, pp. 966–8. In this article the kinetics of the hydrolysis of this monoperester are described. Although mention is made of the possibility to use this monoperester as a radical initiator in polymerization processes, molecular weight regulation ability is not disclosed.

Furthermore, Fedorova et al, *Izv. Vyssh. Uchebn. Zaved, Khim. Khim. Tekhnol.*, 19 (10), 1976, pp. 1504–6, discloses α-tert-butyl monoperoxy-β-methylitaconate. This, however, is not a peroxide used in the process according to the present invention. Neither is the use of this particular peroxide in polymerization processes or its potential ability to act as a molecular weight regulator, disclosed herein.

Finally, German patent application DE 1,944,756 discloses α-peresters of itaconate. These compounds are not comprised in formula I of the unsaturated organic peroxides to be used in the process of the present invention. In addition, although these α-peresters may be used as an initiator in polymerization processes, nowhere is the use of these α-peresters as molecular weight regulators disclosed.

Preferably, $R_1$ in the formula I is selected from the group consisting of alkoxycarbonyl, carbonyl, aryl, alkaryl, aralkyl, aryloxycarbonyl, carboxy, carbonate, sulfone, sulfoxide, phosphonate, phosphine oxide, and amide, or a group containing two or more of these functionalities which may be the same or different, all of the groups being optionally substituted with one or more hydroxy, epoxy or carboxy functionalities.

More preferably, $R_1$ is an optionally substituted carbonyl, an optionally substituted alkoxycarbonyl, an optionally substituted aryloxycarbonyl, a carboxy or an optionally substituted amide group.

The group $R_1$ may be selected on the basis of its influence on the chain transfer coefficient of the unsaturated organic peroxide. Thus, for a particular unsaturated organic peroxide, $R_1$ can be selected to control the reactivity of the chain transfer agent such that the chain transfer coefficient is as close to optimal as possible. In this manner, the monomeric starting materials can be added in the ratio in which they are desired in the polymeric products.

$R_2$ is a group preferably selected from tertiary butyl, pinanyl, cumyl, and tertiary pentenyl. $R_3$ is preferably a group selected from hydrogen and methyl.

The unsaturated organic peroxides used in the process of the present invention correspond to the above-described formula I. They may be prepared in the usual manner for similar peroxides.

For example, in preparing the unsaturated organic peroxides use may be made of an alkenyl derivative of the general formula:

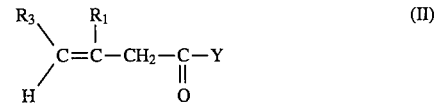
(II)

wherein $R_1$ and $R_3$ are as defined above, and Y is Cl, Br, OH, OOH, or a different leaving group. The alkenyl derivative can be reacted in the usual way with a hydroperoxide. For example, an alkenyl halide is reacted with a hydroperoxide, in an alkaline medium, in the presence of a phase transfer catalyst.

Another useful method for the preparation of the unsaturated organic peroxides is to first prepare an unsaturated peracid and then react it with an additional material to thereby introduce the group $R_2$.

In the case of $R_1$ being a carboxy group, i.e. β-substituted monoperoxyitaconate, the unsaturated organic peroxides may be prepared by reacting itaconic anhydride with a hydroperoxide. A description of the preparation of β-tert-butyl monoperoxyitaconate is given in Fedorova et al., *Visn.*

*L'viv Polithekh. Inst.*, 149, 1981, pp. 43–7. In this process the reaction is acid catalyzed, i.e. acetic acid is used. On the other hand, it is also possible to carry out the reaction in the presence of a base, such as sodium acetate. Such a reaction is described in Japanese patent application JP 7 6007 648 for the preparation of mono-tert alkyl peroxymaleic acid.

In the case of $R_1$ being a carbonyl, an alkoxycarbonyl, an aryloxycarbonyl, or an amide group, the β-substituted monoperoxyitaconate, of which the preparation is outlined above, reacts to form an acid halide compound, and, subsequently, reacted with an alkyl, an alcohol, an arylalcohol or an amine group.

As examples of suitable hydroperoxides for use in the preparation of the unsaturated organic peroxides may be mentioned:

t-butyl hydroperoxide,
t-pentyl hydroperoxide,
1,1-dimethyl butyl hydroperoxide,
1,1-diethyl propyl hydroperoxide,
1,1-dimethyl-3-hydroxybutyl hydroperoxide,
1,1,3,3-tetramethyl butyl hydroperoxide,
1,1-dimethyl-2-propenyl hydroperoxide,
1-methyl-1-ethyl-2-propenyl hydroperoxide,
1,1-diethyl-2-propenyl hydroperoxide,
1-ethenyl-1-hydroperoxycyclohexane,
1,1-dimethyl-2-propynyl hydroperoxide,
p-menthyl hydroperoxide,
α-cumyl hydroperoxide,
pinanyl hydroperoxide,
1-methylcyclopentyl hydroperoxide,
2-hydroperoxy-2-methyl tetrahydrofurane,
1-methoxycyclohexyl hydroperoxide,
1,3,4,5,6,7-hexahydro-4a (2H)-naphthalenyl hydroperoxide,
β-pinene hydroperoxide, and
2,5-dihydro-2-methyl-2-furanyl hydroperoxide.

As preferred examples of the unsaturated organic peroxides which are useful as chain transfer agents according to the process of the present invention, the following compounds may be mentioned:

β-tert-butyl monoperoxyitaconate,
β-pinanyl monoperoxyitaconate, and
β-tert-butyl monoperoxy-α-ethylitaconate.

The unsaturated organic peroxides can be prepared, transported, stored and applied as such or in the form of powders, granules, solutions, aqueous suspensions, emulsions, pastes, or by any other known method. Which of these physical forms is preferred will depend on the particular polymerization system being employed. Also, considerations of safety (desensitization) may play a role. Desensitizing agents may, in fact, be used with the unsaturated organic peroxides and particularly suitable desensitizing agents include solid carrier materials such as silica, chalk, and clay, inert plasticizers or solvents such as mono-or dichlorobenzene, and, of course, water.

The process of the present invention may be operated in the same manner as processes employing conventional chain transfer agents such as thiols. For example, the present process can be used in the manufacture of synthetic rubbers and other polymer formulations where reduced molecular weight aids polymer processing and improves the polymer properties. The process is also applicable to the production of low-molecular weight polymers and oligomers for a variety of applications such as for use in paints or coatings.

The chain transfer agents used in the process of the present invention offer several advantages. First, these materials exhibit an unexpectedly good ability to control molecular weights in polymerization processes. Thus, (co)polymers of various molecular weights, with accurate control of the $M_n$, can be obtained. In its simplest form, molecular weight can be regulated simply by varying the amount of unsaturated organic peroxide chain transfer agent added to the system.

Secondly, the method of the present invention is extremely versatile as is evidenced by the variety of polymerizations in which molecular weight regulation has been successful.

Thirdly, the severe retardation of polymerization observed for unsaturated organic peroxide chain transfer agents of the prior art is greatly reduced and sometimes monomer conversion is even improved in comparison to the control when the unsaturated organic peroxides of the present invention are employed as chain transfer agents.

In the present process, one simply carries out a standard polymerization process in the presence of one or more compounds of the formula I to thereby regulate the molecular weight of the polymer and provide functional end groups on the polymer. The reaction is generally carried out under standard polymerization conditions for the monomer being polymerized. Preferably, the polymerizable monomer is selected from the group consisting of acrylates, methacrylates, styrene, styrene derivatives, vinyl esters, dienes, acrylonitrile, α-olefins, vinyl chloride, vinylidene chloride, vinylidene fluoride, and mixtures thereof.

As a polymerization initiator may be used conventional polymerization initiators known in the art. The preferred polymerization initiator will often depend upon the particular monomers to be polymerized. In the case of styrene or methyl methacrylate polymerizations, the polymerization initiator of choice is azobisisobutyronitrile (AIBN). Generally, the amount of polymerization initiator used will be determined by known data for the particular polymerization process and will be independent of the type and amount of the chain transfer agent to be employed.

The chain transfer agent itself may be employed in various amounts depending primarily upon the monomer being polymerized, the chain transfer coefficient of the chain transfer agent, and the desired molecular weight range to be obtained. As little as 0.001 mole percent of chain transfer agent based on the monomer can be used and up to 30.0 mole percent may also be employed. In general, from 0.1 to 15 mole percent of the chain transfer agent will produce the desired result. Of course, mixtures of different chain transfer agents may also be employed.

It is preferred to select a chain transfer agent which has a decomposition temperature above the polymerization temperature, i.e. the decomposition temperature of the polymerization initiator, since decomposition of the chain transfer agent will reduce the chain transfer activity. However, this need not always be the case. For example, in some instances it may be desirable for the unsaturated organic peroxide to act as both a chain transfer agent and an initiator, in which case some decomposition of the peroxide will be desirable.

The present invention also relates to the (co)polymers and oligomers which are formed by the process of the invention. Furthermore, the present invention also includes articles of manufacture which comprise one or more (co)polymers or oligomers made by the process of the present invention. These articles of manufacture are useful in the coating industry, as lubricants, processing aids, and interfacial agents for polymers, among other uses. Finally, the present invention relates to the use of unsaturated organic peroxides of the above-identified formula I as a chain transfer agent in radical (co)polymerization reactions.

The following examples are presented to further illustrate the present invention.

EXAMPLE 1

Preparation of β-tert-butyl monoperoxyitaconate (βTBPI)

Itaconic anhydride (11.21 g) was added to a 35% solution of anhydrous tert-butyl hydroperoxide in toluene (27.0 g) at 25° C. Sodium acetate (82 mg) was added to the obtained mixture and the resulting mixture was stirred until all the itaconic anhydride was converted (4–5 hr). βTBPI crystallized out of the mixture, was isolated by filtration and dried to constant weight (yield: 50% of the theoretical amount). The solvent of the filtrate was removed under vacuum (rotavapor) and the residue gave a second and a third crop of βTBPI (yield: 13–15 and 8–10%, respectively). The remaining mixture consisted of the β-perester (5–10%) and also the α-perester (14–17%) and some itaconic acid (1–3%). The structure was confirmed by IR and NMR spectroscopy.

EXAMPLE 2

Preparation of β-tert-butylperoxy-α-ethylitaconate (βTBPαEI)

N,N-dimethylformamide (0.75 g) was added to a slurry of β-tert-butyl monoperoxyitaconate (21.0 g) in toluene (75 ml) at 15° C. Subsequently, a solution of oxalylchloride (15.5 g) in toluene (25 ml) was added dropwise over 60 minutes. After the addition the mixture was stirred for another hour and filtered through a G-3 glass filter. The solvent was removed (60 mbar/35° C.) to give β-tert-butylperoxy-α-chloride-itaconate, which was dissolved in ethanol (9.2 g). To this solution, pyridine (9.5 g) was added dropwise at 8°–10° C. After the addition the mixture was stirred for 30 minutes, filtered and dissolved in toluene (25 ml). This solution was washed with water (20 ml), water (18 ml)+15% $H_2SO_4$ (2 ml) and water (18 ml)+1N HCl (2 ml), and subsequently dried on $MgSO_4$. The solvent was removed to give 15.5 g product with a perester content of 82%. Total yield was 59%. The structure was confirmed by IR and NMR spectroscopy.

EXAMPLE 3

Preparation of β-pinanyl monoperoxyitaconate (αPPI)

Itaconic anhydride (11.2 g) was added to a solution of pinanylhydroperoxide-50% in pinane (34.0 g) and toluene (10.0 g) at 25° C. Sodium acetate (0.20 g) was added to the obtained mixture and the resulting mixture was stirred until all the itaconic anhydride was converted (5–6 hr.). The solvent was partly removed from the obtained mixture to yield 45.0 g of a 56% solution of α-pinanyl monoperoxyitaconate (12%) and β-pinanyl monoperoxyitaconate (77%) in toluene/pinane. Total yield 89%. The structure was confirmed by IR and NMR spectroscopy.

EXAMPLE 4

Polymerization in the presence of βTBPI

Three different monomers were polymerized in the presence of βTBPI, i.e. styrene (STY), methyl methacrylate (MMA), and butyl acrylate (BA). To a 1.2 molar solution of monomer in o-dichlorobenzene were added 0.5 mole % of azobisisobutyronitrile (AIBN) and varying amounts of βTBPI as a chain transfer agent. The polymerization was carried out at a temperature of 80° C. over a period of 60 minutes for styrene and over a period of 30 minutes for methyl methacrylate and butylacrylate. The results are shown in Table 1. In addition, Table 1 also includes a control polymerization wherein no chain transfer agent was employed but otherwise all conditions remained the same. Thus, the effect of the chain transfer agent on the molecular weight of the formed polymer is clearly demonstrated. Calculation of the chain transfer coefficient for βTBPI for the polymerization of the three monomers yielded values of 0.36 (STY), 0.35 (MMA), and 0.43 (BA), respectively.

TABLE 1

| [βTBPI]/[MONOMER] | STY Mn | MMA Mn | BA Mn |
| --- | --- | --- | --- |
| 0 | 9018 | 23715 | 11165 |
| 0.02 | 4378 | 7794 | 6339 |
| 0.04 | 3483 | 5117 | 4486 |
| 0.06 | 2988 | 3906 | 3126 |

EXAMPLE 5

Polymerization in the presence of βTBPαEI

The procedure of Example 4 was repeated, except that βTBPαEI was substituted for βTBPI. Calculation of the chain transfer coefficient for βTBPαEI for the polymerization of the three monomers yielded values of 0.41 (STY), 0.37 (MMA), and 0.39 (BA), respectively. The polymerization results are listed in Table 2.

TABLE 2

| [βTBPαEI]/[MONOMER] | STY Mn | MMA Mn | BA Mn |
| --- | --- | --- | --- |
| 0 | 8373 | 20710 | 14185 |
| 0.02 | 4568 | 7644 | 7014 |
| 0.04 | 3360 | 4986 | 4868 |
| 0.06 | 2693 | 3656 | 3593 |

EXAMPLE 6

Polymerization in the presence of βPPI

The procedure of Example 4 was repeated, except that βPPI was substituted for βTBPI. Calculation of the chain transfer coefficient for βPPI for the polymerization of the three monomers yielded values of 0.60 (STY), 0.41 (MMA), and 0.52 (BA), respectively. The polymerization results are listed in Table 3.

TABLE 3

| [βPPI]/[MONOMER] | STY Mn | MMA Mn | BA Mn |
| --- | --- | --- | --- |
| 0 | 9018 | 23715 | 11165 |
| 0.02 | 3987 | 7080 | 5716 |
| 0.04 | 2748 | 4714 | 3660 |
| 0.06 | 2232 | 3502 | 2730 |

EXAMPLE 7

The monomer conversions of the polymerization reactions for styrene and methyl methacrylate of the Examples 4–6 were measured and compared with the monomer conversion of the polymerization reaction of the same monomers in the presence of ethyl-t-butylperoxymethylpropenoate (ETBPMP). The preparation of ETBPMP is described in WO 91/07387. Results for styrene are listed in Table 4. Results for methyl methacrylate are listed in Table 5. Clearly, the retardation effect of the prior art chain transfer agent is greatly reduced by the use of the unsaturated organic peroxides in the process of the present invention.

TABLE 4

| [peroxide]/ [STY] | monomer conversion (%) | | | |
|---|---|---|---|---|
| | βTBPI | βTBPαEI | βPPI | ETBPMP |
| 0 | 11.7 | 11.5 | 11.7 | 12.4 |
| 0.02 | 11.5 | 12.1 | 11.2 | 10.6 |
| 0.04 | 12.7 | 13.1 | 12.7 | 16.5 |
| 0.06 | 14.6 | 14.5 | 15.8 | — |
| 0.07 | — | — | — | 10.3 |

TABLE 5

| [peroxide]/ [MMA] | monomer conversion (%) | | | |
|---|---|---|---|---|
| | βTBPI | βTBPαEI | βPPI | ETBPMP |
| 0 | 50.4 | 53.4 | 50.4 | 55.3 |
| 0.02 | 52.7 | 55.2 | 50.4 | 35.8 |
| 0.04 | 43.0 | 53.2 | 52.4 | 27.7 |
| 0.06 | 41.9 | 54.1 | 56.0 | — |
| 0.07 | — | — | — | 25.1 |

EXAMPLE 8

The monomer conversions of the polymerization reactions for butyl acrylate of the Examples 4–6 were measured and compared with the monomer conversion of the polymerization reaction of the same monomer in the presence of ETBPMP as described in WO 91/07387. More particularly, the reduction of the monomer conversion was measured by comparing the monomer conversion of polymerization reactions carried out without a chain transfer agent and with a peroxide/monomer ratio of 0.04. The monomer conversion was reduced by 27.2%, 18.8%, and 14.3% while using βTBPI, βTBPαEI, and βPPI respectively, instead of a 64.9% reduction obtained when using ETBPMP. Again, it is shown that the retardation effect of prior art chain transfer agents is greatly reduced by the use of the unsaturated organic peroxides in the process of the present invention.

The foregoing examples have been presented for the purpose of illustration and description only and are not to be construed as limiting the scope of the invention in any way. The scope of the invention is to be determined by the claims appended hereto.

We claim:

1. A method of radically (co)polymerizing monomers with a polymerization initiator in the presence of an effective amount of at least one unsaturated organic peroxide chain transfer agent, wherein the unsaturated organic peroxide is selected from the group represented by the following formula:

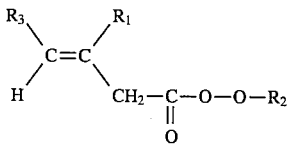

wherein $R_1$ is an activating group capable of enhancing the reactivity of the olefinic unsaturation towards free radical addition; $R_2$ is selected from the group of hydrogen, $C_1$-$C_{18}$ alkyl, $C_3$-$C_{18}$ alkenyl, $C_3$-$C_{18}$ alkynyl, $C_7$-$C_{22}$ aralkyl, and $C_3$-$C_{18}$ saturated or unsaturated carbocyclic and heterocyclic rings; and $R_3$ is selected from the group of hydrogen, $C_1$-$C_{18}$ alkyl, $C_3$-$C_{18}$ alkenyl, $C_6$-$C_{18}$ aryl, $C_6$-$C_{22}$ alkaryl, and $C_7$-$C_{22}$ aralkyl, or $R_1$ and $R_3$ may combine to form a $C_5$-$C_{10}$ ring; all of groups $R_1$, $R_2$, and $R_3$ may be linear or branched and may be optionally substituted with one or more groups selected from hydroxy, alkoxy, aryloxy, epoxy, halogen, acid, ester, nitrile, ketone, and amido.

2. The method of claim 1, wherein $R_1$ is selected from the group of alkoxycarbonyl, carbonyl, aryl, alkaryl, aralkyl, aryloxycarbonyl, carboxy, carbonate, sulfone, sulfoxide, phosphonate, phosphine oxide, and amide, or a group containing two or more of these functionalities which may be the same or different, all of the groups being optionally substituted with one or more hydroxy, epoxy or carboxy functionalities.

3. The method of claim 2, wherein $R_1$ is a group, optionally substituted with hydroxy, epoxy, or carboxy, selected from the group of carbonyl, alkoxycarbonyl, aryloxycarbonyl, carboxy, and amide, or a group containing two or more of these functionalities which may be the same or different.

4. The method of claim 1 wherein $R_2$ is a group selected from tertiary butyl, pinanyl, cumyl, and tertiary pentenyl; and $R_3$ is a group selected from hydrogen and methyl.

5. The method of claim 1 wherein from 0.001 to 30.0 mole percent of said unsaturated organic peroxide, based on the moles of polymerizable monomer, is employed.

6. The method of claim 1 wherein said polymerizable monomer is selected from the group of acrylates, methacrylates, stryene, stryene derivatives, vinyl esters, dienes, acrylonitrile, α-olefins, vinyl chloride, vinylidene chloride, vinylidene fluoride, and mixtures thereof.

7. The method of claim 1 wherein said chain transfer agent has a higher decomposition temperature than said polymerization initiator.

8. A method for regulating the molecular weight of a (co)polymer in a radical polymerization reaction which comprises utilizing in said reaction an effective amount of at least one unsaturated organic peroxide chain-transfer agent of the formula:

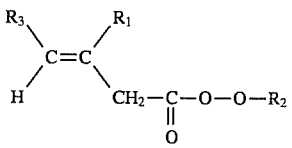

wherein $R_1$ is an activating group capable of enhancing the reactivity of the olefinic unsaturation towards free radical addition; $R_2$ is selected from the group of hydrogen, $C_1$-$C_{18}$ alkyl, $C_3$-$C_{18}$ alkenyl, $C_3$-$C_{18}$ alkynyl, $C_7$-$C_{22}$ aralkyl, and $C_3$-$C_{18}$ saturated or unsaturated carbocyclic and heterocyclic rings; and $R_3$ is selected from the group of hydrogen, $C_1$-$C_{18}$ alkyl, $C_3$-$C_{18}$ alkenyl, $C_6$-$C_{18}$ aryl, $C_6$-$C_{22}$ alkaryl, and $C_7$-$C_{22}$ aralkyl, or $R_1$ and $R_3$ may combine to form a $C_5$-$C_{10}$ ring; all of groups $R_1$, $R_2$, and $R_3$ may be linear or branched and may be optionally substituted with one or more groups selected from hydroxy, alkoxy, aryloxy, epoxy, halogen, acid, ester, nitrile, ketone, and amido.

* * * * *